(No Model.)
G. W. GATES.
GRAIN DRILL.
No. 459,121. Patented Sept. 8, 1891.
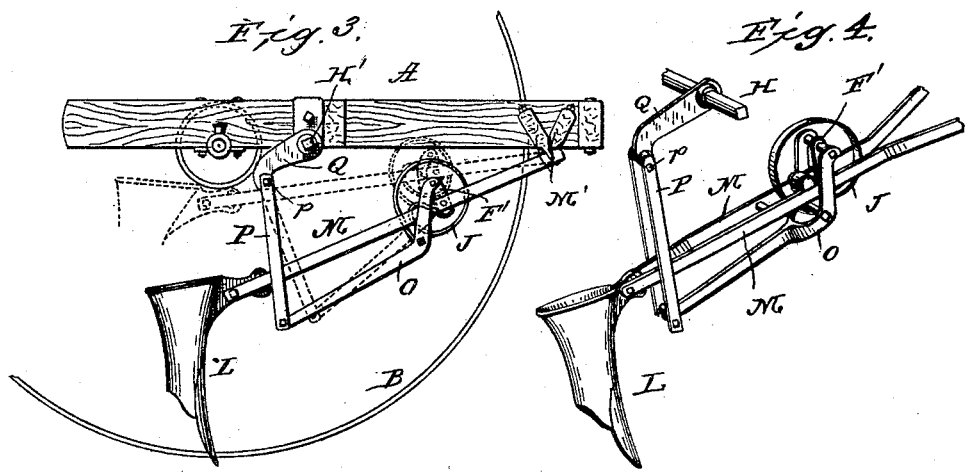
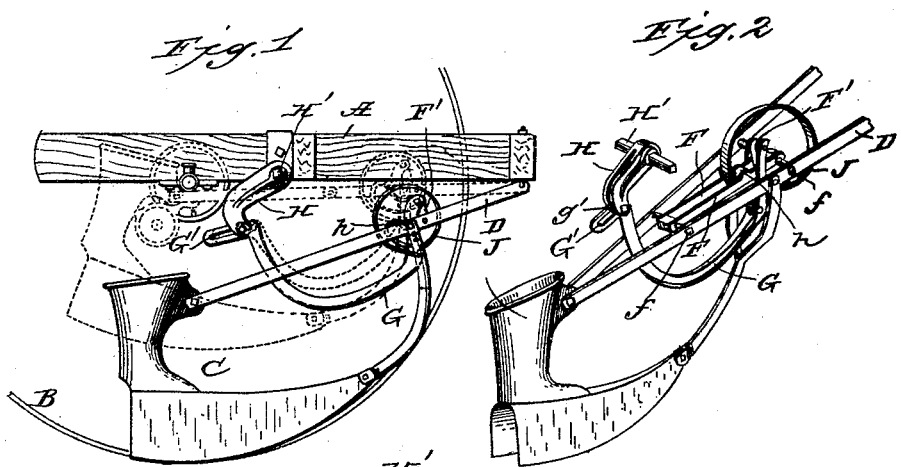
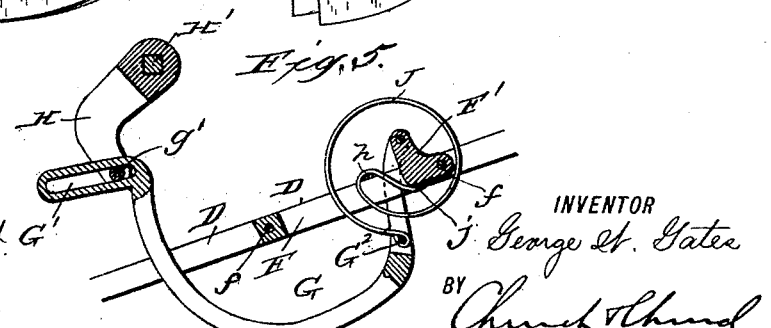
WITNESSES:
Thomas Durant
E. D. Smith
INVENTOR
George W. Gates
BY Church & Church
his ATTORNEYS

UNITED STATES PATENT OFFICE.

GEORGE W. GATES, MACEDON, NEW YORK.

GRAIN-DRILL.

SPECIFICATION forming part of Letters Patent No. 459,121, dated September 8, 1891.

Application filed December 9, 1890. Serial No. 374,107. (No model.)

*To all whom it may concern:*

Be it known that I, GEORGE W. GATES, of Macedon, in the county of Wayne and State of New York, have invented certain new and useful Improvements in Grain-Drills; and I do hereby declare the following to be a full, clear, and exact description of the same, reference being had to the accompanying drawings, forming a part of this specification, and to the letters of reference marked thereon.

My present invention relates to that class of agricultural machines employing blades or teeth entering the ground and held in more or less yielding contact therewith by gravity or a spring—such, for instance, as seeding-machines, grain-drills, &c.; and it has for its objects to provide a cheap and simple device for facilitating the operations of the drills or teeth, whereby greater latitude of motion will be permitted when a hummock or obstruction is encountered than in machines at present in use, and whereby, also, the adjustment of the drills and their removal from the ground may be readily accomplished when desired; and to these ends it consists in certain novelties of construction and combinations of parts, all as will be hereinafter described, and the novel features pointed out particularly in the claims at the end of this specification.

In the accompanying drawings, Figure 1 represents a side elevation of a drill-runner and its attached parts, showing in dotted lines the position assumed by the parts when the drill is raised from the ground by an obstruction; Fig. 2, a perspective view of the same; Fig. 3, a side elevation of the invention applied to a different form of drill, showing in dotted lines the position assumed by the parts when encountering an obstruction or hummock; Fig. 4, a perspective view of the same; Fig. 5, a sectional view of the form shown in Figs. 1 and 2.

Similar letters of reference indicate similar parts.

Referring particularly to Fig. 1, the letter A indicates the main frame supported on the usual wheels B, and C a drill of the runner or shoe form, connected to the main frame by a leader or drag-bar D bolted to its upper portion. The forward extension of the runner is bifurcated, as shown, and the two ends are bolted to the side bars of the leader, which latter is constructed of two bars somewhat widely separated at the forward ends, while the rear ends converge somewhat as in Fig. 2.

F F indicate two plates fastened between the bars of the leader by bolts $f\,f$, and between said plates is bolted an arm or casting F', having an aperture in its upper end, while the portion below said plates is laterally extended and slightly rounded at $j$, as shown in Fig. 5.

Pivoted to the upper end of the arm F' is a lever G, bifurcated at the forward end and extending downward, backward, and preferably slightly upward at the rear, where it is provided with a slot G', in which operates a roller $g'$, secured to the bifurcated end of a rock-arm H, mounted on the usual rock-shaft H', for adjusting the drills and holding them in elevated or depressed position.

J indicates a spring pivoted to the lever G at the lower part of its bifurcated portion on a bolt $G^2$ and extending rearward and upward between plates F F, thence downward and around the arm F', thence upward and over a suitable rounded block $h$, supported on them and having plane edges resting on the plates F, thence downward again, where its end is engaged with the projection $j$.

When the rock-arm H is depressed and in the position in which it is shown in Fig. 1, it will be seen that the tendency of the spring will be to keep the drill depressed, causing it to enter and pass through the ground with a yielding pressure, the arrangement, however, being such that the drill can raise when striking a stone or hummock to the position indicated in dotted lines, if necessary, the leader passing above the extremity of the rock-arm and lever arranged between its sides; and herein lies one of the great advantages of the present construction, as it enables me to provide for the excessive upward movement of the drill by an obstruction without unnecessarily increasing the diameter of the supporting-wheels or impairing the efficiency of the springs for holding the drills in the ground. To raise the drill, it is only necessary to elevate the rock-arm H, as usual, the spring forming the intermediate connection between the lever and leader, as will be understood.

I have deemed it necessary to show in the drawings only one drill shoe or runner and its connected parts, also to show only one rock-arm and the shaft H' as the means for operating and locking the latter and the construction are well known in the art, and therefore do not need further elaboration herein. Of course any number of drill-runners may be employed.

In Figs. 3 and 4 I have shown the application of my invention to a drill or tooth attached to its leader at the top only, L representing the drill-tooth; M, the leader composed of bars or plates diverging at the forward ends and attached to the pivotal bars M', as usual; F', the arm, in this instance bolted between the bars of the leader, which are close together; J, the spring, shaped as before described and connected to the lever O at the lower end of its bifurcated forward portion. In this construction the lever O, instead of extending up through the leader, is arranged below it and its lower end is pivoted to links P extending on opposite sides of the latter upward and pivoted by a bolt $p$ to the end of rock-arm Q, attached to rock-shaft H', before described. In this arrangement, when the drill-tooth strikes a hummock or large obstruction, it will rise to the position shown in dotted lines against the tension of the spring J, as before described, the arrangement permitting an extended movement without affecting arm Q.

It will be understood that, if desired, the usual arrangement of parts embodying two connected bars M' may be provided for "staggering" the teeth, as shown; but description of this is not necessary, as with ordinary draft-bars, the operation, as far as my invention is concerned, would be the same.

By the employment of a pivotal connection between the rock-arms and the lever, which latter is in turn connected to the drill-leader through the spring connection shown, the necessary movements for passing an obstruction are permitted, and the space occupied by the parts is comparatively small; also, the pressure of the teeth on the ground can be easily regulated by the adjustment of the rock-shaft H' or raised entirely by it, as usual.

The arrangement of parts in Figs. 3 and 4 will permit the leader to be raised until actual contact between it and the rock-arm, while in Figs. 1 and 2 it may rise even above this, as the bars of the leader are somewhat separated, so that the arm and lever can pass between.

It is obvious that in the construction shown in Figs. 3 and 4 the members of the leader could be separated, as in Fig. 1, and the link and rock-arm be permitted to pass between when the tooth and leader is raised, as will be understood, and I therefore do not desire to be confined to precisely the construction shown.

While I have described and shown the rock-arms H as the means of adjusting the tooth or drill and in practice prefer it, the term "movable arm" employed in the claims is used merely as a term of designation for an adjustable part to which the end of the lever is pivotally connected, and I do not therefore desire to be confined to precisely the arrangement of parts shown. So, also, other modifications could be readily made without departing from the spirit of my invention, such as would readily occur to those skilled in the art.

I claim as my invention—

1. The combination, with the main frame, a drill-tooth, and a leader therefor, of a lever pivoted on the leader, a spring connection between the lever and leader, a movable arm on the frame, and a pivotal connection between the lever and said arm, substantially as described.

2. The combination, with the main frame, a drill-tooth, and a leader therefor, of the arm or extension on the leader, the lever pivoted on said extension, the spring connected to the leader at one end and to the lever at the other, and the movable arm on the frame pivotally connected to the lever, substantially as described.

3. The combination, with the main frame, a drill-tooth, and a leader therefor composed of the two bars, of the lever pivoted on the leader arranged between the sides thereof, the spring connected to the leader at one end and to the lever at the other, and the movable arm on the main frame pivotally connected to the lever, substantially as described.

4. The combination, with the drill-tooth and a leader therefor, of the arm on the leader, the lever having the bifurcated end pivoted on said arm, the spring connected to the arm and lever, and the movable arm on the main frame pivotally connected to the lever, substantially as described.

5. The combination, with the main frame, the tooth, and the leader, of the arm secured to the leader, the spring having its end arranged beneath said arm and extending over a block on the leader, then below and around said arm, the block, the lever pivoted on the arm and connected to the free end of the spring, and an adjustable pivotal connection between the free end of the lever and main frame, substantially as described.

6. The combination, with the main frame, a drill-tooth, and leader, of the spring connected at one end to the leader, the lever having the slotted end pivoted on the leader and connected to the free end of the spring, and the rock-arm on the frame having a pin or roller engaging the slot in the lever, substantially as described.

7. The combination, in a seeding-machine, of a drill-tooth, a leader therefor, a lever pivoted on the leader, a spring connected to the leader and lever, and means for raising and lowering the free end of the lever, and through it the leader and tooth, substantially as described.

GEORGE W. GATES.

Witnesses:
FRED F. CHURCH,
A. W. GATES.